United States Patent
Kaneda et al.

(10) Patent No.: US 6,547,174 B1
(45) Date of Patent: Apr. 15, 2003

(54) HOUSING FOR TAPE CARTRIDGE AND HOLD FOR MOLD FOR FORMING THE SAME

(75) Inventors: Hiroshi Kaneda, Tokyo (JP); Motohiko Shima, Tokyo (JP); Masatoshi Okamura, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/591,247

(22) Filed: Jun. 9, 2000

(30) Foreign Application Priority Data

Jun. 22, 1999 (JP) ............................................. 11-175164

(51) Int. Cl.[7] ........................................... G11B 23/027
(52) U.S. Cl. ................................... 242/348.2; 242/347
(58) Field of Search ............................ 242/348.2, 348, 242/347, 338.4, 332.4; 360/132

(56) References Cited

U.S. PATENT DOCUMENTS

| | | | |
|---|---|---|---|
| 4,668,062 A | | 5/1987 | Lippert |
| 4,735,377 A | * | 4/1988 | Zuehsow ..................... 242/379 |
| 4,775,115 A | * | 10/1988 | Gelardi ..................... 242/348.2 |
| 4,828,201 A | * | 5/1989 | Smith ....................... 242/348.2 |
| 4,977,474 A | * | 12/1990 | Oishi et al. ............... 242/348.2 |
| 5,128,815 A | * | 7/1992 | Leonhardt et al. ......... 242/332.4 |
| 5,209,425 A | * | 5/1993 | Krabbenhoft et al. ..... 242/348.2 |
| 5,261,626 A | * | 11/1993 | Hoge et al. ............... 242/348.2 |
| 5,348,243 A | * | 9/1994 | Ohmachi et al. .......... 242/347 |
| 5,472,655 A | | 12/1995 | Morita ....................... 264/245 |
| 5,640,904 A | * | 6/1997 | Sato et al. ................ 242/348.2 |
| 5,758,836 A | | 6/1998 | Stanley et al. ............. 242/342 |
| 5,868,333 A | * | 2/1999 | Nayak ...................... 242/348.2 |
| 5,883,771 A | * | 3/1999 | Hoerger .................... 242/348.2 |
| 5,927,633 A | * | 7/1999 | McAllister ................ 242/348.2 |
| 6,205,001 B1 | * | 3/2001 | Vanderheyden et al. . 242/338.4 |
| 6,332,997 B1 | * | 12/2001 | Hardigg et al. |
| 6,364,982 B1 | * | 4/2002 | Lynch et al. |

FOREIGN PATENT DOCUMENTS

| | | |
|---|---|---|
| DE | g 88 06 117.5 | 8/1988 |
| EP | 0 635 833 A2 | 1/1995 |
| JP | 60-258783 | 12/1985 |
| JP | 63-16834 | 4/1988 |
| JP | 63-172624 | 7/1988 |
| JP | 51-24689 | 5/1993 |
| JP | 60-05040 | 1/1994 |
| JP | 11-048295 | 2/1999 |

OTHER PUBLICATIONS

European Search Report in European 11 1892.6 dated Jul. 31, 2001.

* cited by examiner

*Primary Examiner*—William A. Rivera
(74) *Attorney, Agent, or Firm*—Marshall, Gerstein & Borun

(57) ABSTRACT

In a housing for tape cartridge which holds therein a tape reel on which a medium in the form of a tape is wound, an outer surface portion of a side wall, out of surrounding walls, of the housing facing the direction of cartridge insertion into a recording-reproducing apparatus has a draft of zero degree where it comes in contact with positioning means of the apparatus. In a mold for forming the housing, a mold portion that forms an outer surface portion of a side wall, out of surrounding walls, of the housing facing the direction of cartridge insertion into a recording-reproducing apparatus, is constituted by a slide having a plane perpendicular to the direction of insertion.

1 Claim, 4 Drawing Sheets

FIG. 4(a)
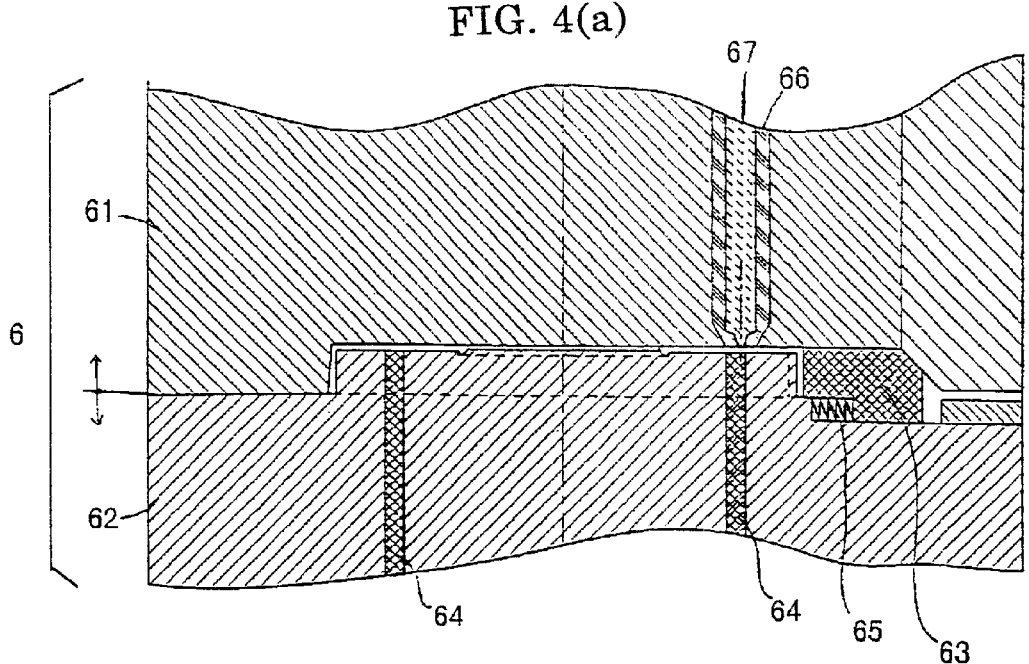
FIG. 4(b)
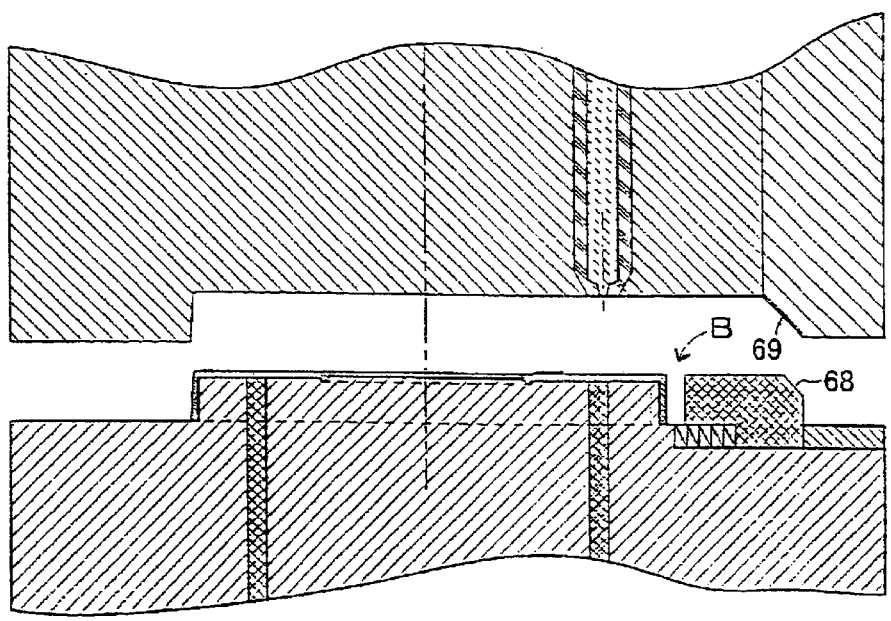
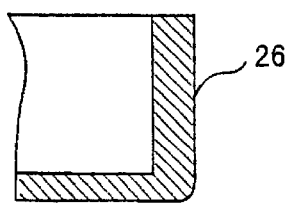
FIG. 5

FIG. 6(a) Prior Art
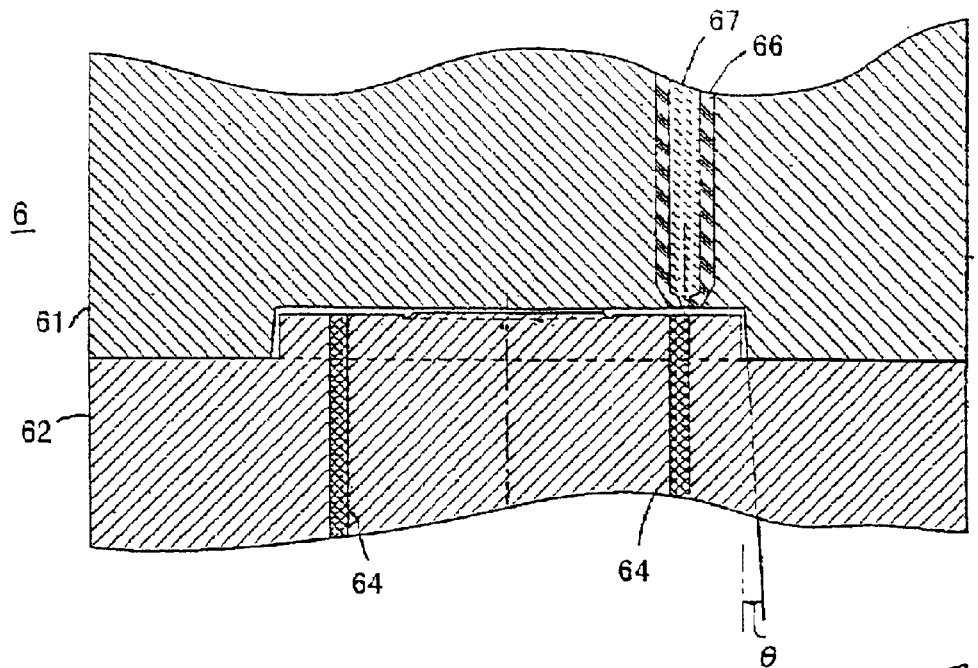
FIG.6(b) Prior Art
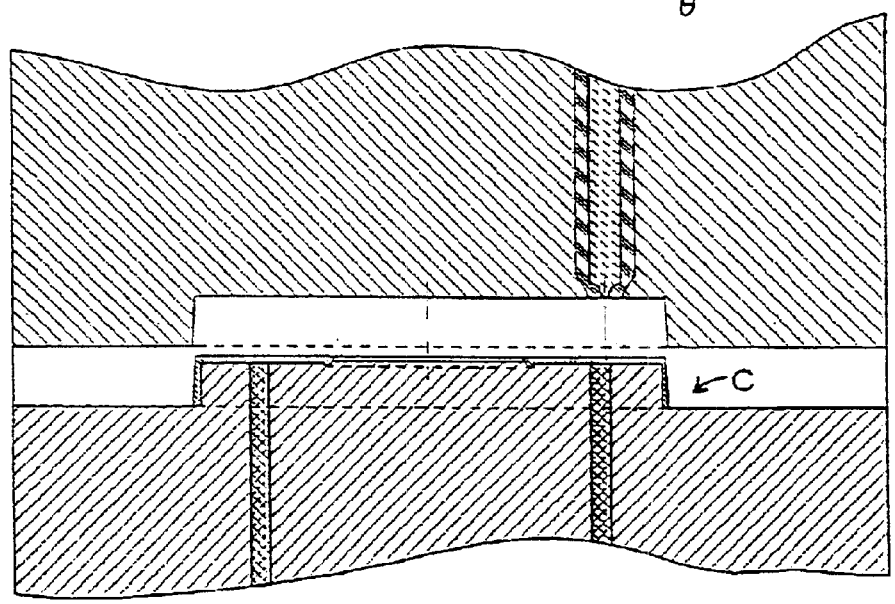
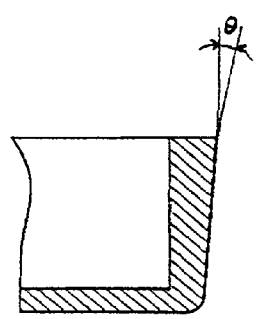
FIG. 7 Prior Art

HOUSING FOR TAPE CARTRIDGE AND HOLD FOR MOLD FOR FORMING THE SAME

BACKGROUND OF THE INVENTION

1. Field of the Invention

This invention relates to a housing for tape cartridge to be used with a recording-reproducing apparatus (hereinafter called a "recorder"), more particularly to a housing for tape cartridge of the type having positioning walls for insertion into a recorder, and also relates to a mold for forming the housing.

2. Prior Art

For cartridges holding a reel or reels around which a length of magnetic tape is wound, recorders have positioning means to control the position of each such cartridge inserted into the machine, whereas the cartridge is formed with positioning ribs for engagement with the positioning means. For example, Japanese Patent Application Kokoku No. 63-16834 discloses a cartridge formed with low positioning ribs formed on both left and right of a tape draw-out portion at the front of the cartridge. After position control with such means, reference pins from a recorder gain entrance into reference holes formed in the underside of the cartridge to effect more precise positioning.

The prior art teaches forming positioning ribs in the tape draw-out region at the front of a cartridge, keeping them low compared with the height of side walls of the housing. Structural limitation, however, does not favor providing ribs in that location and it is preferable to form them instead on the outer surface of side wall of the housing in the direction of cartridge insertion into a recorder.

Actually molding of casings requires a draft, and the outer surface of side wall of the housing is inclined rather than perpendicular to the direction of insertion. Thus if the side wall is utilized in positioning, a problem arises in that the amount of cartridge insertion becomes instable, interrupting smooth fitting of reference pins of a recorder in the reference holes formed in the underside of the cartridge.

The problem will now be explained in more detail. FIGS. 6 and 7 illustrate the exterior side wall of an upper or lower casing of a conventional cartridge housing and a mold of the prior art for forming the casing. FIG. 6($a$) shows a mold 6 closed for resin molding and FIG. 6($b$), the mold opened after molding. Mold 6 is composed of a fixed mold part 61 and a movable mold part 62. It performs molding as molten resin 67 is poured into a mold cavity defined between the two mold parts 61, 62 via a gate 66 (FIG. 6($a$)). After molding, the molded article is released from the mold by ascending ejector pins 64 (FIG. 6($b$)).

The surface of fixed mold part 61 that makes the outer surface of side wall 26 of a casing (FIG. 7) has a draft or inclination of θ (usually from 0.5 to several degrees) to the perpendicular. As a consequence, side wall 26 of a casing molded as in FIG. 7 (an enlarged view of the circled portion C in FIG. 6($b$)) has an inclination 8 corresponding to the draft, and when it is partly utilized in positioning, the afore-described problem arises.

The present invention has for its object to achieve positioning of a cartridge housing with good precision by utilizing its side wall as a positioning plane.

BRIEF SUMMARY OF THE INVENTION

The invention realizes the above object by a housing for tape cartridge which holds therein a tape reel on which a medium in the form of a tape is wound, characterized in that an outer surface portion of a side wall, out of surrounding walls, of the housing facing the direction of cartridge insertion into a recorder has a draft of zero degree (perpendicular to the direction of insertion) where it comes in contact with positioning means of the recorder. The invention also achieves the object by a mold for forming such a housing, characterized in that the mold portion that forms an outer surface portion of a side wall, out of surrounding walls, of the housing facing the direction of cartridge insertion into a recorder is constituted by a slide having a plane perpendicular to the direction of insertion.

With the construction described, the cartridge can be accurately positioned within a recorder since a perpendicular positioning plane formed on the wall of the cartridge housing in the direction of insertion into the recorder comes in contact with positioning means of the recorder having perpendicular contacting surface. The amount of insertion is made stable, allowing precise fitting of reference pins of the recorder into reference holes formed in the underside of the cartridge housing.

BRIEF EXPLANATION OF THE DRAWINGS

FIG. 4 shows a mold for forming a casing embodying the invention, (a) when it is closed and (b) when opened;

FIG. 5 is an enlarged view of the portion B of FIG. 4;

FIG. 6 shows a mold of the prior art for forming a casing, (a) when it is closed and (b) when opened; and FIG. 7 is an enlarged view of the portion C of FIG. 6.

DESCRIPTION OF THE PREFERRED EMBODIMENTS

Figure 1:
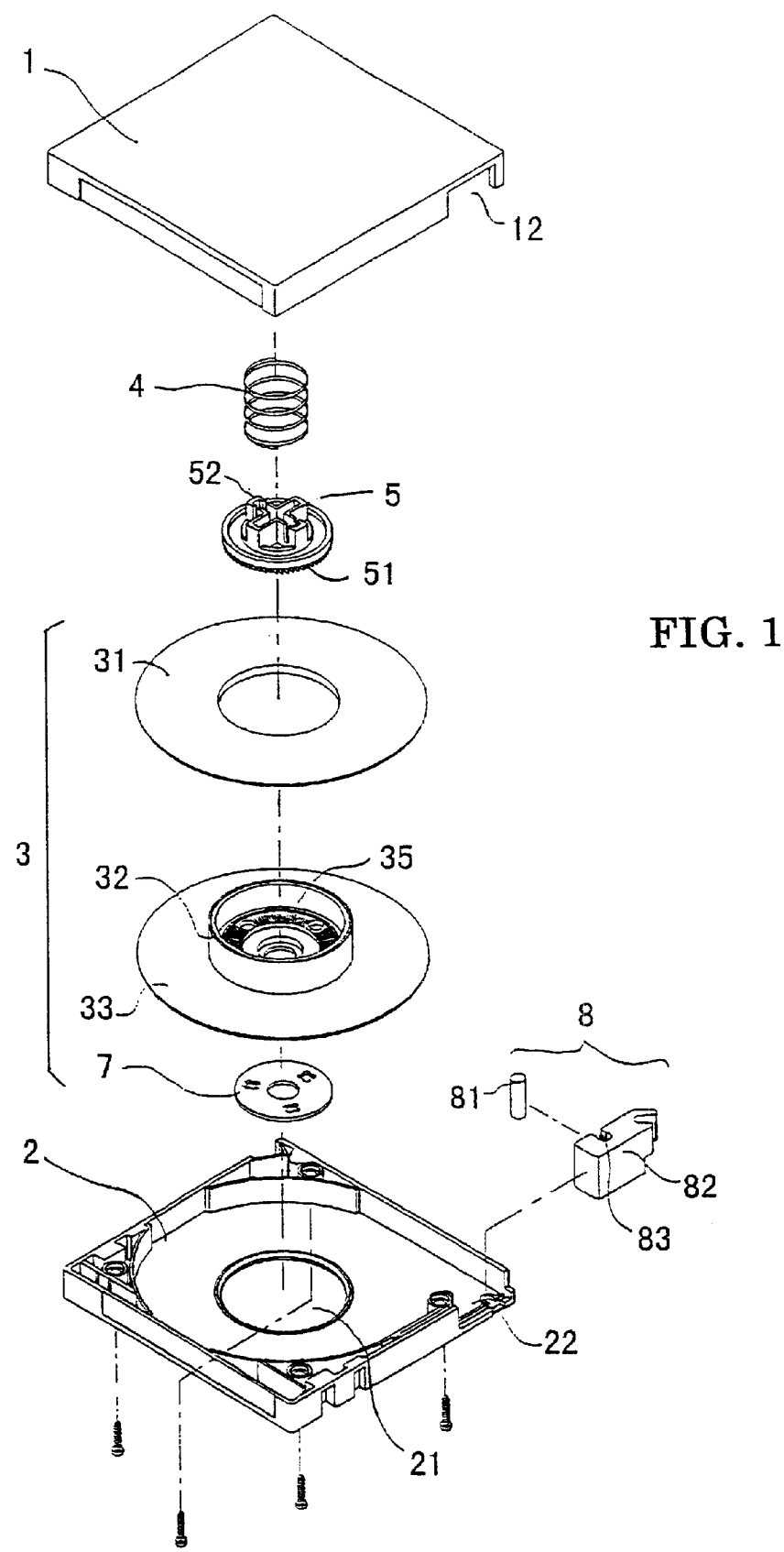
FIG. 1 is an exploded view of a tape cartridge embodying the present invention.

FIG. 1 is an exploded view of a tape cartridge embodying the present invention.

The cartridge holds a single tape reel 3 on which a length of tape is wound turnably within a housing composed of an upper casing 1 and a lower casing 2.

Lower casing 2 has a hole through which a drive shaft of a recorder is to be inserted. Upper and lower casings 1, 2 have openings 12, 22, respectively, through which the tape is drawn out.

Tape reel 3 is an integral assembly of an upper flange 31, a hub 32 formed in one piece with a lower flange 33, and a metal disk 7 fitted to the underside of hub 32. Around the metal disk 7, teeth 36 (FIG. 2) are formed in one piece with hub 32 to mesh with a drive shaft of a recorder. Metal disk 7 is magnetically attracted by the drive shaft to turn tape reel 3.

Hub 32 has a tooth-like part 35 formed on its inner surface to be in mesh with a brake lock 5 so as to prevent unwanted turning of tape reel 3 when the latter is not in use.

Brake lock 5 has a tooth-like part 51 formed on its underside in mesh with the corresponding part 35 of hub 32. Brake lock 5 is normally urged in the braking position by a brake spring 4.

A follower projection 52 of brake lock 5 has a cruciform recess which slidably engages with a guide member (not shown), allowing brake lock 5 to move up and down positively between a lower braking position and an upper brake release position.

As soon as the cartridge is loaded in a recorder, a release pin (not shown) that comes out of the recorder into the cartridge lifts brake lock 5 upwardly while metal disk 7 secured to tape reel 3 is being sucked up by magnetic means of the recorder, whereby teeth 51 and corresponding teeth 35 of tape reel 3 are disengaged, setting the reel free to turn.

The beginning of tape is fixed to a leader 8. The leader end of tape is partly wound round a pin member 81, which in turn is fixedly fitted in a pin-receiving groove 83 of a leader block 82. Leader block 82 in this state is located in openings 12, 13. When the cartridge is loaded in a recorder, leader block 82 is gripped by a draw member that comes in from the recorder, and tape is threaded along a tape path to a take up reel of the recorder and is finally held in a recess formed in the outer periphery of the take up reel.

Figure 2:
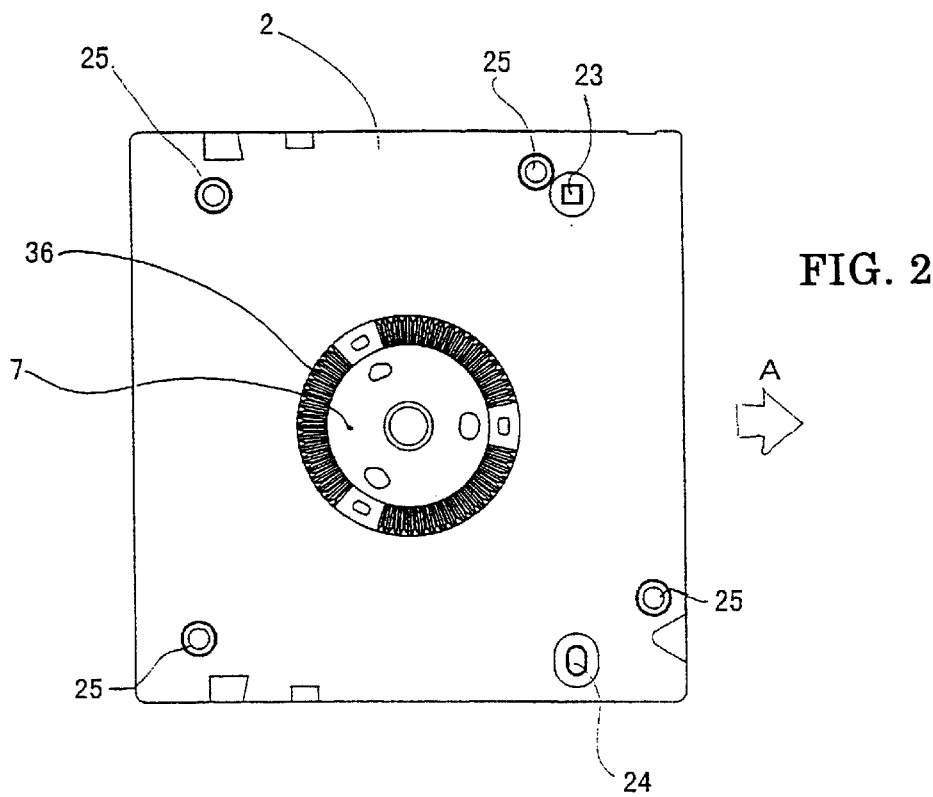
FIG. 2 is a bottom view of the cartridge.

FIG. 2 is a plan view of the cartridge as viewed from below its underside.

The direction in which the cartridge is inserted into a recorder is indicated by an arrow, and on the left and right of lower casing 2 in the insertion direction are formed, respectively, small reference holes 23, 24 adapted to receive reference pins (not shown) of a recorder for final positioning of the cartridge with respect to the recorder. Indicated at 25 are joints where screws are tightened to join upper and lower casings together.

Figure 3:
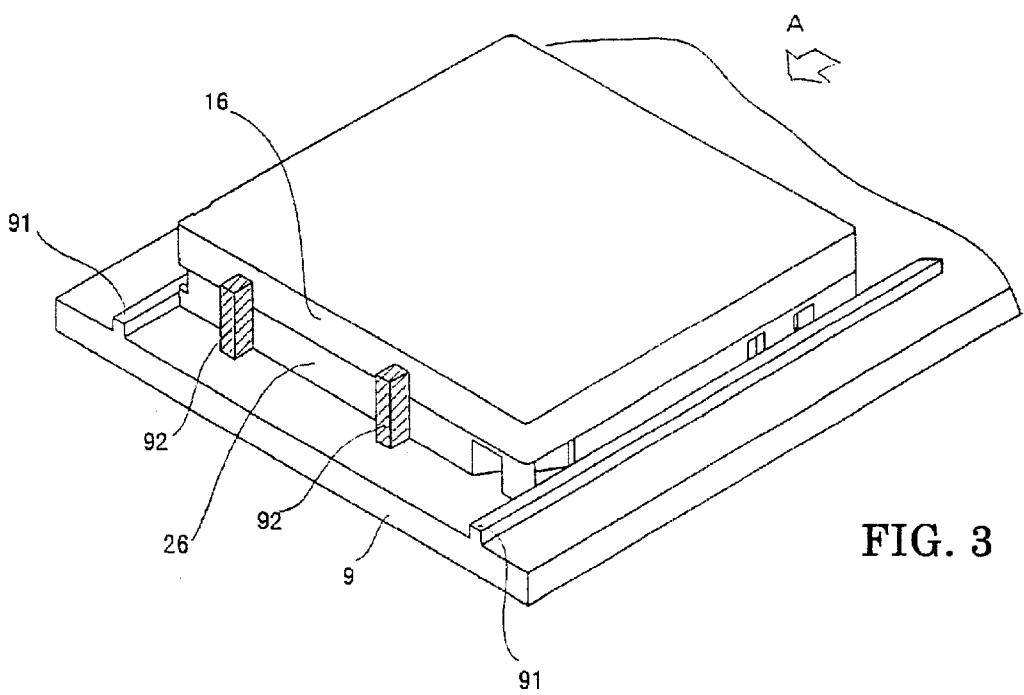
FIG. 3 is a perspective view of the cartridge as inserted into a recorder.

FIG. 3 is a perspective view of the cartridge as set on a holder of a recorder. The insertion point of the cartridge is defined by two positioning posts 92 provided on holder 9. Designated 91 are guides along which the cartridge is inserted in place.

The portions of side walls 16, 26 of upper and lower casings 1, 2 that come in contact with positioning posts 92 are perpendicular and do not have the drafts of the remainders of the side walls. The cartridge therefore is exactly positioned by positioning posts 92.

In the illustrated embodiment the height of positioning posts 92 reaches the side wall of upper casing 1, and both upper and lower casings 1, 2 must be perpendicular on this side. When the posts are not high enough to reach upper casing 1, only the side wall 26 of lower casing 2 has to be perpendicular.

As for the molds to form the side walls 16, 26 that come in contact with the positioning posts, it is impossible to remove a casing from a mold if the mold surface to form such a side wall is simply perpendicular. Under the invention, therefore, a mold including a slide as illustrated in FIG. 4 is used to form an outer surface of side wall 26 having a perpendicular plane (with a draft of zero degree).

FIG. 4(*a*) shows a mold 6 closed for resin molding and FIG. 4(*b*) shows the mold opened after molding. Mold 6 comprises a fixed mold part 61 and a movable mold part 62. A slide 63 having a perpendicular molding face and capable of sliding in the direction normal to the mold opening direction is used as a perpendicular face molding unit of movable mold part 62. In order to drive slide 63, the upper portion on the side of slide 63 opposite to the perpendicular molding face is sloped 68, and the sloped portion 68 is adapted to engage with a sloped portion 69 of fixed mold part 61.

As mold 6 is closed, the sloped portion 68 of slide 63 is pushed by the sloped portion 69 of fixed mold part 61, bringing slide 63 to position in FIG. 4(*a*). As mold 6 is opened after molding, slide 63 is urged by a spring 65 toward the direction normal to the mold opening direction (FIG. 4(*b*)). Consequently, a perpendicular plane can be formed in this portion of side wall 26 (and side wall 16).

When mold 6 has opened, a product (lower casing 2) is taken out with the aid of ejector pins 64.

Thus, under the invention, the molding face of slide 63 is made perpendicular and, as illustrated in FIG. 5 that is an enlarged view of the encircled portion B in FIG. 4(*b*), the positioning plane for the side wall 26 of lower casing (and side wall 16 of upper casing too) is perpendicular, making accurate positioning of the cartridge possible.

According to the invention, positioning for the direction of cartridge insertion into a recorder is made precise and dependable, and cartridge loading in reference position is stabilized with added reliability.

What is claimed is:

1. The housing for a tape cartridge, comprising:

surrounding walls formed of molded plastic material holding therein a tape reel on which a tape medium is wound, wherein an outer surface portion of a side wall, out of the surrounding walls of the housing, facing a direction of cartridge insertion into a recording reproducing apparatus has a draft of zero degrees, wherein said outer surface portion is adapted to come into contact with positioning means of the apparatus, and wherein said outer surface portion having said draft of zero degrees is formed by a slide mold portion having a plane substantially perpendicular to the direction of insertion.

* * * * *

UNITED STATES PATENT AND TRADEMARK OFFICE
CERTIFICATE OF CORRECTION

PATENT NO.    : 6,547,174 B1
DATED         : April 15, 2003
INVENTOR(S)   : Hiroshi Kaneda et al.

It is certified that error appears in the above-identified patent and that said Letters Patent is hereby corrected as shown below:

<u>Title page,</u>
Title should read: -- [54] HOUSING FOR TAPE CARTRIDGE AND MOLD FOR FORMING THE SAME --

Signed and Sealed this

Fourteenth Day of October, 2003

JAMES E. ROGAN
*Director of the United States Patent and Trademark Office*